United States Patent [19]

Zeeban et al.

[11] Patent Number: 4,833,911

[45] Date of Patent: May 30, 1989

[54] SYSTEM FOR MEASURING AIRCRAFT ENGINE THRUST

[75] Inventors: Joe P. Zeeban, Renton; Paul E. Johnson, Bellingham, both of Wash.

[73] Assignee: The Boeing Company, Seattle, Wash.

[21] Appl. No.: 214,378

[22] Filed: Jul. 1, 1988

[51] Int. Cl.⁴ .......................................... G01M 15/00
[52] U.S. Cl. ................................................. 73/117.4
[58] Field of Search .......................... 73/117.4, 147; 364/431.01

[56] References Cited

U.S. PATENT DOCUMENTS

| | | | |
|---|---|---|---|
| 2,455,251 | 11/1948 | Hersey | 230/114 |
| 2,579,617 | 12/1951 | Schaevitz | 73/116 |
| 2,941,399 | 6/1960 | Bersinger | 73/116 |
| 3,538,760 | 10/1970 | Atkey et al. | 73/117.4 |
| 3,837,220 | 9/1974 | McDonald et al. | 73/117.4 |
| 3,886,790 | 6/1975 | Plett | 73/117.4 |
| 4,003,249 | 1/1977 | Laskedy | 73/117.4 |
| 4,130,872 | 12/1978 | Harloff | 73/117.4 X |

OTHER PUBLICATIONS

SAE Transactions, vol. 66, 1958, pp. 357–363, "Thrust Measurement for Jet Transport Operations" by M. J. Saari.

*Primary Examiner*—Jerry W. Myracle
*Attorney, Agent, or Firm*—Dellett, Smith-Hill and Bedell

[57] ABSTRACT

The present invention comprises a system for measuring the thrust delivered by aircraft engines which rely on induced flow for their propulsive effect. In the preferred embodiment, for use in conjunction with turboprop engines, the system includes mechanisms for measuring static pressure immediately in front of the turbopropellers and for measuring free stream ambient pressure. These pressure measurements are furnished to a computational device such as air data computer for use in calculating a static to ambient pressure ratio which correlates with commanded thrust in accordance with mach number. The pressure ratio information may be displayed for direct use by the aircraft pilot in determining thrust or adjusted for the effects of mach number and then displayed as an indication of net thrust, and/or supplied to other aircraft instrument systems requiring thrust information.

14 Claims, 1 Drawing Sheet

SYSTEM FOR MEASURING AIRCRAFT ENGINE THRUST

BACKGROUND OF THE INVENTION

The present invention relates to avionics systems and more specifically to instrument systems for measuring the thrust produced by aircraft engines.

It is important for the thrust developed by aircraft engines to be accurately and reliably measured in order to fix engine thrust ratings and assure airplane takeoff field length and climb out performance. Historically, gear driven turboprop powered aircraft have used torquemeters located on the turboshaft between the power producer and propeller to measure thrust. Shaft torque and RPM are then employed to determine the horsepower delivered to the propeller. For ungeared turboprop engines without a shaft drive and turbofan engines the pressure ratio across the core engine has been used to provide an indication of the power supplied by the system. In all such cases, windtunnel tests with scale models are commonly used to specify the conversion between shaft power and commanded thrust as delivered by the propellers or fan blades.

In operation these systems assume that uniform amounts of thrust are produced by the propeller system as determined by the operation of the power plant. No account is or can be made for variable losses due to deterioration of the propeller, gearbox or power turbine or for the full range of environmental conditions (e.g. icing) which may affect the propeller system. Therefore, the indicated thrust set in accordance with these systems may not accurately reflect the actual thrust produced.

It is, therefore, an object of the present invention to provide a system for accurately measuring the thrust produced by aircraft engines which rely on induced flow for their propulsive effect.

It is another object of the present invention to provide a thrust measuring system for turboprop engines which supplies measurements that directly reflect the actual thrust produced.

It is a further object of the present invention to provide a thrust measuring system for aircraft engines which is of comparatively simple design yet is accurate, reliable and effective under a full range of environmental conditions.

SUMMARY OF THE INVENTION

The present invention relates to a system for measuring the thrust developed by aircraft engines which rely on induced flow for their propulsive effect. The present inventors have discovered that a useful mathematical relationship exists between the static pressure measured directly in front of the driving element, i.e. the propellers of a turboprop engine or fan blades of a turbofan engine, and the thrust delivered by such engines. The thrust varies uniformly with the ratio of the static pressure to a reference free stream pressure such as ambient pressure or total pressure at a given mach number.

Thus, the system of the present invention comprises a device for measuring the static pressure immediately in front of propellers of a turboprop engine or the fan blades of a turbofan engine and a corresponding apparatus for determining the ambient pressure or total pressure of the atmosphere surrounding the aircraft. The resulting information is furnished to a computational mechanism such as an air data computer which calculates a ratio of the previously described static to ambient pressure or of the static to total pressure. These ratios correlate with the commanded thrust provided by the engine at specific mach numbers (airspeeds) and consequently allow thrust to be readily computed. The pressure ratios may be displayed on an instrument gauge for use by the pilot either before or after adjustment for the effects of mach number or supplied to other avionics systems for use in control applications.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENTS

Figure 1:
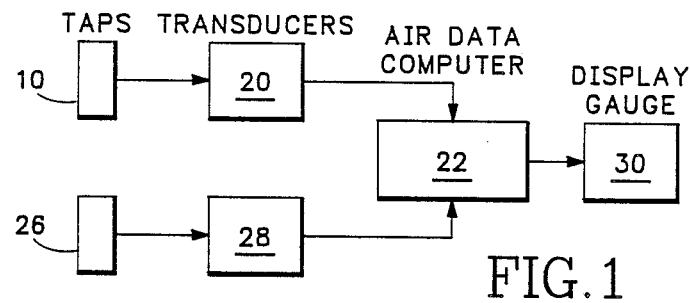
FIG. 1 is a functional block diagram of one embodiment of the system which comprises the present invention.
Figure 2:
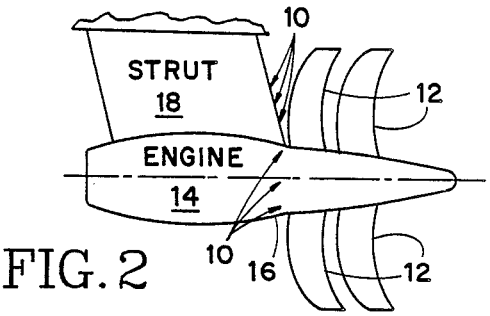
FIG. 2 is a side view of a turboprop engine as mounted on an aircraft wing showing the locations at which static pressure taps may be installed in accordance with the present invention.

Referring now to FIG. 1, the present invention includes one or more and preferably 3 to 6 pressure taps 10 which are located immediately forward of the plane of rotation of the propellers 12 of an engine such as a turboprop aircraft engine 14 as shown in FIG. 2. The pressure taps 10 are preferably located on the nacelle 16 associated with the engine 14 but may also be located on the trailing edge of the strut 18 supporting the engine provided that they can thereby be positioned in close proximity to the propellers 12. It should be noted that the propellers may be single or counter rotating tractor or pusher propellers.

The pressure taps 10 are pneumatically connected to a pressure transducer 20 which measures the static pressure, or an average static pressure, at the positions of the taps 10. The transducer 20 converts this pressure into a corresponding electrical signal representing the static pressure at the tap positions. This signal is then furnished to the air data computer 22 for the aircraft associated with the engine 14. The pressure transducer 20 must generally be sensitive to small pressure variations on the order of 0.003 psia.

Likewise, a second electrical signal representing ambient pressure is provided to the air data computer 22 by the pressure tap 26 and transducer 28. The pressure tap 26 and transducer 28 correspond to equipment available on most aircraft for sensing ambient pressure. However, the transducer 28 must also be sensitive to small pressure variations. It should, however, be noted that free stream total pressure as sensed in the forward direction of the aircraft may be alternatively measured and furnished to the air data computer 22 for use in calculating a pressure ratio useful in accordance with the principles of the present invention.

The air data computer 22 or another equivalent processing mechanism functions to calculate a ratio of the static and ambient pressures by generating an electrical signal representing the quotient of the values corresponding to the static and ambient pressure signals.

This pressure ratio signal is then furnished to a display gauge 30 whereby the information incorporated in the signal can be displayed to the pilot of the aircraft associated with the engine 14. Alternately, the pressure ratio signal and the information it represents may be provided to other avionics gear, such as throttle control instruments, for use in aircraft control applications or further processed in accordance with mach number as will be later discussed.

The operation of the present invention may be better understood with reference to the aerothermodynamics of the gas flow through a propeller system. Under isentropic flow conditions with a compressible gas, the thrust may be expressed in terms of mass flow and air flow velocity:

$$F_{np} = W_p/g \, (V_p - V_{fs})$$

Where:
$F_{np}$ = thrust
$W_p$ = mass flow
$V_p$ = velocity at propeller exit
$V_{fs}$ = free stream velocity (airspeed)
$g$ = gravitational constant However, the mass flow $W_p$ may be expressed in terms of static pressure, velocity and temperature:

$$W_p = P_s A/RT_s \, ((V_p + V_{fs})/2)$$

Where:
$P_s$ = static pressure in front of propellers
$A$ = flow area
$R$ = universal gas constant
$T_s$ = static temperature Furthermore, static temperature $T_s$ may be related to total temperature, the specific heats of air and total pressure as follows:

$$P_t/P_s = (T_t/T_s)^{G/G-1}$$

Where:
$P_t$ = total pressure
$T_t$ = total temperature (Rankine)
$G$ = specific heat ratio ($C_p/C_v$)
$C_v$—at constant volume
$C_p$—at constant pressure The foregoing equations may be algebraically combined to yield the expression below:

$$gF_{np} = (P_s)(A/RT_t)(P_t/P_s)^{G-1/G}((V_p^2 - V_{fs}^2)/2)$$

This equation demonstrates that thrust is a function of static pressure in a manner substantially independent of temperature and also indicates that the mach number may affect thrust.

Figure 3:
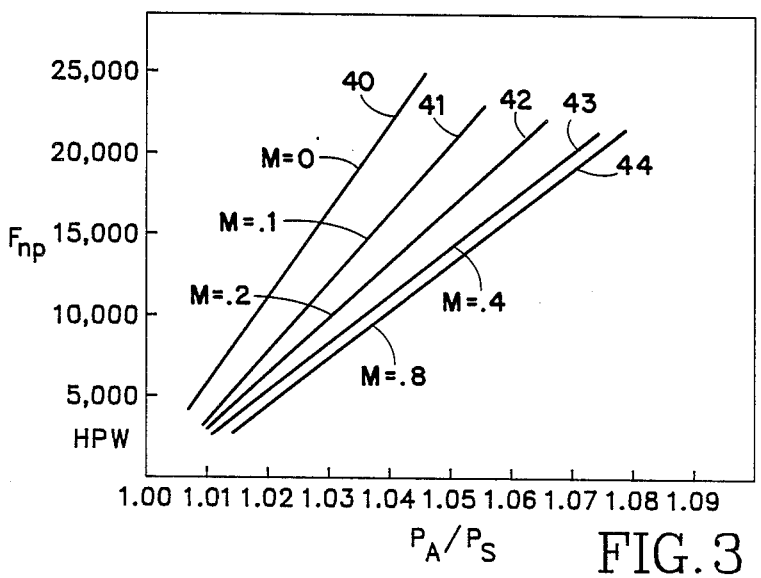
FIG. 3 is a graph illustrating the relationship between the static to ambient pressure ratio and commanded thrust which comprises the mathematical basis for the present invention.

In accordance with empirical tests, thrust has been verified to be an approximately linear function of the total to static pressure ratio and the static to ambient pressure ratio for static pressure measured immediately forward of the plane in which the propeller rotates at a given mach number (airspeed). FIG. 3 graphically illustrates this relationship with the plot lines 40–44 representing correlations between the static to ambient pressure ratio (on the abscissa) for a turboprop engine and the thrust (on the ordinate) delivered by the propeller system for the different mach numbers 0.0, 0.1, 0.2, 0.4, 0.8, respectively.

Therefore, the present invention was conceived to take advantage of these correlations in computing thrust. In operation, the pressure ratio calculated by the air data computer 22 is displayed by the gauge 30 and furnishes the pilot with a number which provides a reliable indication of thrust on the runway and during takeoff or which can otherwise be used to readily calculate thrust in flight with reference to the mach number of the aircraft.

It should be noted that the air data computer 22 can be programmed to automatically adjust the pressure ratio signal in accordance with the mach number of the aircraft in order to provide a corrected thrust signal for display on the gauge 30 which may accurately indicate net thrust under all conditions.

The present invention may also be used in conjunction with turbofan engines with variable exhaust areas. In such applications the static pressure tap must be located immediately forward of the fan blades on the inner cowl or nose dome of the engine. The ratio of this static pressure to ambient pressure again provides an indication of the thrust being developed by the engine. Adjustments must also be made to this pressure ratio in accordance with mach number in order to provide in flight indications of engine thrust.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A thrust measuring device for use with a turboprop engine on an aircraft, comprising:
   a first pressure detection means for measuring the static pressure immediately forward of the plane of rotation of the propeller of the engine and providing a signal representative of said static pressure;
   a second pressure detection means for measuring the ambient pressure of the atmosphere surrounding the aircraft and providing a signal representative of said ambient pressure; and
   means for generating a pressure ratio signal corresponding to a quotient of said static and ambient pressure signals, said pressure ratio signal being indicative of the thrust developed by said turboprop engine.

2. The thrust measuring device of claim 1, further including:
   means for displaying information corresponding to said pressure ratio signal so as to provide a visual indication of engine thrust to an aircraft pilot.

3. The thrust measuring device of claim 1, wherein:
   said first pressure detection means includes one or more pressure taps located on the nacelle of said engine directly in front of the position at which the propellers are mounted.

4. The thrust measuring device of claim 1, further including:
   means for forming a corrected thrust signal when said aircraft is in flight by adjusting said pressure ratio signal in accordance with the mach number of said aircraft in order to correct for the effects of airspeed on the relationship between the ratio of said pressures to the thrust developed by said turboprop engine.

5. The thrust measuring device of claim 4, further including:
means for displaying information corresponding to said corrected thrust signal so as to provide a visual in flight indication of engine thrust to an aircraft pilot.

6. A thrust measuring device for use with a turbofan engine on an aircraft, comprising:
a first pressure detection means for measuring the static pressure immediately forward of the plane of rotation of the fan blades of the engine and providing a signal representative of said static pressure;
a second pressure detection means for measuring the ambient pressure of the atmosphere surrounding the aircraft and providing a signal representative of said ambient pressure; and
means for generating a pressure ratio signal corresponding to a quotient of said static and ambient pressure signals, said pressure ratio signal being indicative of the thrust developed by said turbofan engine.

7. The thrust measuring device of claim 6, further including:
means for displaying information corresponding to said pressure ratio signal so as to provide a visual indication of engine thrust to an aircraft pilot.

8. The thrust measuring device of claim 6, further including:
means for forming a corrected thrust signal when said aircraft is in flight by adjusting said pressure ratio signal in accordance with the mach number of said aircraft in order to correct for the effects of airspeed on the relationship between the ratio of said pressures to the thrust developed by said turbofan engine.

9. A thrust measuring device for use with a turboprop engine on an aircraft, comprising:
a first pressure detection means for measuring the static pressure immediately forward of the plane of rotation of the propellers of the engine and providing a signal representative of said static pressure;
a second pressure detection means for measuring the total pressure of the atmosphere in the forward direction affecting the aircraft and providing a signal representative of said total pressure; and
means for generating a pressure ratio signal corresponding to a quotient of said static and total pressure signals, said pressure ratio signal being indicative of the thrust developed by said turboprop engine.

10. The thrust measuring device of claim 9, further including:
means for displaying information corresponding to said pressure ratio signal so as to provide a visual indication of engine thrust to an aircraft pilot.

11. A method for measuring the thrust developed by an aircraft engine which employs induced flow for its propulsive effect, comprising the steps of:
measuring the static pressure immediately forward of the plane in which said flow is induced by said engine and providing a signal representative of said static pressure;
measuring a free stream reference pressure for the aircraft and providing a signal representative of said reference pressure; and
generating a pressure ratio signal corresponding to a quotient of said static and reference pressure signals, said pressure ratio signal being indicative of the thrust developed by said engine.

12. The thrust measuring device of claim 11, further including the step of:
displaying information corresponding to said pressure ratio signal so as to provide a visual indication of engine thrust to an aircraft pilot.

13. The thrust measuring device of claim 11, further including the step of:
forming a corrected thrust signal when said aircraft is in flight by adjusting said pressure ratio signal in accordance with the mach number of said aircraft in order to correct for the effects of airspeed on the relationship between the ratio of said pressures to the thrust developed by said turboprop engine.

14. The thrust measuring device of claim 11, further including the step of:
displaying information corresponding to said corrected thrust signal so as to provide a visual in flight indication of engine thrust to an aircraft pilot.

* * * * *

UNITED STATES PATENT AND TRADEMARK OFFICE
CERTIFICATE OF CORRECTION

PATENT NO. : 4,833,911

DATED : May 30, 1989

INVENTOR(S) : Joe P. Zeeben and Paul E. Johnson

It is certified that error appears in the above-identified patent and that said Letters Patent is hereby corrected as shown below:

Cover sheet, item 75, "Zeeban" should be --Zeeben--.

Signed and Sealed this

Sixth Day of February, 1990

*Attest:*

JEFFREY M. SAMUELS

*Attesting Officer*   *Acting Commissioner of Patents and Trademarks*